Sept. 10, 1940.   C. G. HAWLEY   2,214,248
EMULSION BREAKER
Filed May 24, 1935
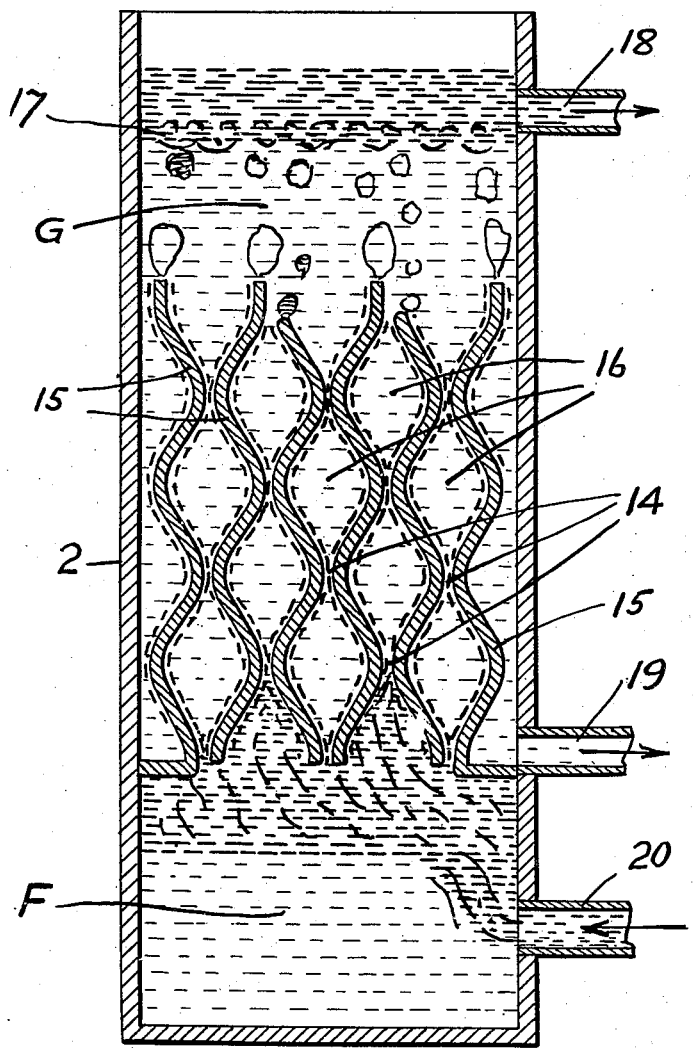
INVENTOR
CHARLES G. HAWLEY, DECEASED
HOPE HAWLEY DEGENHARDT AND VIRGINIA TAYLOR HAWLEY,
BY EX'TRIX:
ATTORNEYS Patented Sept. 10, 1940

2,214,248

UNITED STATES PATENT OFFICE 2,214,248

EMULSION BREAKER

Charles Gilbert Hawley, Chicago, Ill.; Hope Hawley Degenhardt and Virginia Taylor Hawley, executrices of Charles Gilbert Hawley, deceased, assignors to Virginia Taylor Hawley Application May 24, 1935, Serial No. 23,307

1 Claim. (Cl. 210—51)

Emulsions are persistent mixtures of normally immiscible liquids. Present interest attaches to the demulsification of such mixtures in order that the constituents may be separately employed.

This invention is chiefly concerned, first, with oil-in-water emulsions such as settled sewage, oily condensates and like wastes, which contain oil in finely subdivided suspension; and second, with water-in-oil emulsions such as oils that contain finely subdivided water, for example, crude petroleum containing mineralized water.

If such emulsions are allowed to stand quietly, the suspended matter, if heavier, will settle to the bottom; and if lighter, will rise to the top. But such natural separation, greatly influenced by temperature and the relative viscosities of the liquids, is too slow and too costly to meet industrial requirements. Large volumes must be treated and a demulsifying process should be both continuous and economical.

The object of this invention is to provide such a continuous process, and adequate apparatus, whereby emulsions in a state of flow may be separated into differing bodies or streams; and this with slight expenditure of force and so rapidly that the expense of delivering the sought-for products shall add little to the cost thereof.

The principle upon which this invention operates is based on the fact that the components of an emulsion have different affinities or attractions with respect to the surface of any solid to which the emulsion is applied; and, using solids in a submerged state, I employ this difference to effect the above described initial and final separations of the immiscible liquids making up the starting emulsion. By means of this invention it now becomes possible to continuously and economically divide flowing oil and water mixtures or emulsions into distinct oil and water streams.

The action described is so dependable that oils of all gravities may be satisfactorily handled. Some of the very heavy emulsions containing oil of .91 to .96 specific gravity, and highly viscous, are bettered by heating but otherwise the process employed has been exactly as above described. Experience with the very heavy oils proves that the division of oil and water upon the spaced surfaces is explained by the adhesive character of oil as distinguished from that of water. Differences of specific gravity are less important, although it is obvious that a greater difference between the specific gravities of the oil and water means that the upward movement of the collected oil will be more rapid.

The removal of liquid particles from gas presents a different situation and is described and claimed in a companion application, to-wit, S. N. 22,252, filed May 18, 1935.

Having now indicated in a general way the nature and purpose of this invention, I will proceed to a detailed description of a preferred embodiment with reference to the accompanying drawing, in which:

The figure is a cross-sectional view of apparatus embodying this invention.

In the drawing 2 indicates a tank having a lower space F and an upper space G separated from each other by means of a series of fluted or corrugated plates 15. The plates 15 are secured within the tank 2 adjacent to one another with the formation of the many open spaces 16 and the passages or slots 14 which afford communication between vertical series of open spaces 16. The plates are arranged so that communication between the space F and the space G can only be had through the open spaces 16 and the slots or passages 14 formed by the plates. It will be noted that communication between spaces F and G between the outer plates and the walls of the chamber is shut off.

Inlet 20 is provided for the admission to the lower space F of an emulsion of oil and water. The plates 15 terminate below the normal water surface 17 and the oil films deposited on the surface of the plates leave the tops of the plates, which as shown may be serrated, in drop formation rising upon the water. The outlet 18 is provided for discharge of separated oil from the space G above the water surface 17.

Outlet 19, positioned above the lower ends of the plates, is provided for discharge of excess water from the space G.

It will be appreciated that emulsion entering the space F through inlet 20 passes upwardly between the plates 15, i. e., through the passages 14 and spaces 16.

In its passage between the plates the emulsified particles of oil are coalesced on the surfaces of the plates with the formation of droplets which readily separate from the water. The introduction of emulsion and the discharge of separated oil and water is so regulated as to maintain the level of water above the upper ends of the plates as, for example, at 17, and the level of water is, of course, maintained below the outlet 18 for separated oil. As is obvious, the level of water within the space G is readily maintained by regulation of input of emulsion through the inlet 20 and the discharge of water through the outlet 19.

I claim:

An emulsion breaker of the character described comprising a vessel and means for conducting an emulsion, including two immiscible liquids of different specific gravities, to the lower part thereof and for causing upward flow of said liquids therein, in combination with means wholly within the vessel for obstructing the upward flow of said liquids in said vessel and comprising corrugated plates so arranged with respect to one another as to form large chambers in general vertical arrangement therebetween for the reception of said liquids in their upward flow and as to form narrow passages for the passage of said liquids from one chamber to another in their upward flow, and means for maintaining a depth of liquid in said vessel at a level above the top of said plates including means for separately discharging the light and heavy components of the emulsion from the upper part of said vessel.

CHARLES GILBERT HAWLEY.